United States Patent
Shin et al.

(10) Patent No.: US 10,637,112 B2
(45) Date of Patent: Apr. 28, 2020

(54) BUSBAR FOR COOLING BATTERY CELL AND BATTERY MODULE USING SAME

(71) Applicant: LG CHEM, LTD., Seoul (KR)

(72) Inventors: Eun-Gyu Shin, Daejeon (KR);
Jeong-O Mun, Daejeon (KR);
Yoon-Koo Lee, Daejeon (KR);
Jung-Hoon Lee, Daejeon (KR);
Jong-Young Lee, Daejeon (KR);
Byoung-Cheon Jeong, Daejeon (KR);
Mi-Geum Choi, Daejeon (KR);
Hang-June Choi, Dajeon (KR);
Alexander Eichhorn,
Bietigheim-Bissingen (DE); Andreas Track, Bietigheim-Bissingen (DE)

(73) Assignee: LG CHEM, LTD., Seoul (KR)

( * ) Notice: Subject to any disclaimer, the term of this patent is extended or adjusted under 35 U.S.C. 154(b) by 166 days.

(21) Appl. No.: 15/759,172

(22) PCT Filed: Jan. 16, 2017

(86) PCT No.: PCT/KR2017/000533
§ 371 (c)(1),
(2) Date: Mar. 9, 2018

(87) PCT Pub. No.: WO2017/138704
PCT Pub. Date: Aug. 17, 2017

(65) Prior Publication Data
US 2019/0074557 A1    Mar. 7, 2019

(30) Foreign Application Priority Data
Feb. 12, 2016   (KR) .................. 10-2016-0016555

(51) Int. Cl.
*H01M 10/613* (2014.01)
*H01M 2/20* (2006.01)
(Continued)

(52) U.S. Cl.
CPC ........... *H01M 10/613* (2015.04); *H01M 2/20* (2013.01); *H01M 2/206* (2013.01);
(Continued)

(58) Field of Classification Search
CPC .. H01M 10/6553; H01M 10/613; H01M 2/20; H01M 10/658
See application file for complete search history.

(56) References Cited

U.S. PATENT DOCUMENTS

| 8,852,781 | B2  | 10/2014 | Merriman et al. |
| 9,431,644 | B1* | 8/2016  | Eberhard ............. H01M 2/206 |

(Continued)

FOREIGN PATENT DOCUMENTS

| JP | 2009-245730 A | 10/2009 |
| JP | 11-354166 A   | 10/2010 |

(Continued)

OTHER PUBLICATIONS

International Search Report for PCT/KR2017/000533 (PCT/ISA/210) dated Apr. 27, 2017.

*Primary Examiner* — Maria Laios
(74) *Attorney, Agent, or Firm* — Birch, Stewart, Kolasch & Birch, LLP

(57) ABSTRACT

Disclosed are a busbar for cooling battery cells and a battery module using the same. The busbar for cooling battery cells is a busbar configured to cool a plurality of battery cells included in a battery module, and includes: a body portion formed in a strap shape and contacting an electrode lead of each battery cell; and a bent portion integrally formed with the body portion and extending from one end of the body portion to be bent in a thickness direction of the body portion, wherein the bent portion includes: a coupling groove coupled to a coupling protrusion that is prepared on a cooling plate of the battery module or a coupling protru- (Continued)

sion that is prepared on a predetermined frame of the battery module, the predetermined frame supporting the busbar; and a thermal contact surface thermally contacting the cooling plate. Therefore, the busbar efficiently cools the electrode lead of each battery cell, which emits a large amount of heat, and allows simplification and size reduction of a structure of the battery module and reduction in manufacturing costs of the battery module.

13 Claims, 10 Drawing Sheets

(51) Int. Cl.
*H01M 10/625* (2014.01)
*H01M 10/6553* (2014.01)
*H01M 10/6554* (2014.01)
*H01M 10/658* (2014.01)

(52) U.S. Cl.
CPC ....... *H01M 10/625* (2015.04); *H01M 10/658* (2015.04); *H01M 10/6553* (2015.04); *H01M 10/6554* (2015.04)

(56) References Cited

U.S. PATENT DOCUMENTS

| | | |
|---|---|---|
| 2008/0199765 A1 | 8/2008 | Yoon et al. |
| 2009/0208829 A1* | 8/2009 | Howard .............. F28D 15/0233 429/120 |
| 2011/0050260 A1* | 3/2011 | Teramoto ............. G01R 31/364 324/705 |
| 2011/0070474 A1 | 3/2011 | Lee et al. |
| 2014/0370339 A1 | 12/2014 | Kim et al. |
| 2015/0372356 A1* | 12/2015 | Kossakovski ....... H01M 10/625 136/201 |

FOREIGN PATENT DOCUMENTS

| | | |
|---|---|---|
| JP | 2013-229266 A | 11/2013 |
| JP | 2014-229384 A | 12/2014 |
| KR | 10-2007-0043501 A | 4/2007 |
| KR | 10-2010-0109871 A | 10/2010 |
| KR | 10-2013-0021794 A | 3/2013 |
| KR | 10-2013-0071821 A | 7/2013 |
| KR | 10-1415050 B1 | 7/2014 |
| KR | 10-1431717 B1 | 8/2014 |

* cited by examiner

BUSBAR FOR COOLING BATTERY CELL AND BATTERY MODULE USING SAME

TECHNICAL FIELD

The present application claims priority to Korean Patent Application No. 10-2016-0016555 filed on Feb. 12, 2016 in the Republic of Korea, the disclosure of which is incorporated herein by reference.

The present disclosure relates to a busbar for cooling battery cells and a battery module using the same, and more particularly, to a busbar for cooling battery cells, which efficiently cools an electrode lead portion of a battery cell emitting a large amount of heat and allows simplification and size reduction of a structure of a battery module, and a battery module using the same.

BACKGROUND ART

Generally, secondary batteries refer to chargeable-dischargeable batteries such as lithium ion batteries, lithium polymer batteries, nickel cadmium batteries, nickel metal hydride batteries, nickel zinc batteries, and the like.

Recently, as secondary batteries are applied to devices requiring high output voltages and large charge capacities, such as electric vehicles or hybrid electric vehicles, stack-structured battery modules, in which unit battery cells having an output voltage ranging from about 2.5 V to about 4.2 V are connected in series or parallel and stacked, are widely being used. Thus, there is a trend of a rapid increase in interests and requests regarding techniques that allow efficient cooling of a battery module and simplification and size reduction of a structure of the battery module.

However, as disclosed in Korean Patent Publication No. 10-2013-0021794 and the like, according to existing techniques, since battery cells are cooled only by a cooling pin which is interposed between the stacked battery cells and contacts an outer body of a battery cell, that is, a pouch case of the battery cell, there is a problem in that an electrode lead portion of the battery cell, which emits a relatively large amount of heat, may not be efficiently cooled.

In addition, as disclosed in Korean Patent No. 10-1415050 and the like, according to existing techniques, since a large number of cooling pins having a complicated structure are used to improve the cooling capability of a battery module, there are problems in that simplification or size reduction of a structure of the battery module is difficult, and that manufacturing costs of the battery module are increased.

DISCLOSURE

Technical Problem

The present disclosure is designed to solve the problems of the related art, and therefore the present disclosure is directed to providing a busbar for cooling battery cells, which efficiently cools an electrode lead portion of a battery cell emitting a large amount of heat and allows simplification and size reduction of a structure of a battery module and reduction in manufacturing costs of the battery module, and a battery module using the busbar.

Technical Solution

In one aspect of the present disclosure, there is provided a busbar for cooling battery cells, which is configured to cool a plurality of battery cells included in a battery module, the busbar comprising: a body portion formed in a strap shape and contacting an electrode lead of each battery cell; and a bent portion integrally formed with the body portion and extending from one end of the body portion to be bent in a thickness direction of the body portion, wherein the bent portion comprises: a coupling groove coupled to a coupling protrusion that is prepared on a cooling plate of the battery module or a coupling protrusion that is prepared on a predetermined frame of the battery module, the predetermined frame supporting the busbar; and a thermal contact surface thermally contacting the cooling plate.

In one embodiment, the busbar may further comprise an insulating member at least on the thermal contact surface of the bent portion, the insulating member being configured to prevent current flow between the busbar and the cooling plate.

In one embodiment, the busbar may further comprise a gap filler at least on the thermal contact surface of the bent portion, the gap filler being configured to prevent separation between the bent portion and the cooling plate and to transfer heat therebetween.

In one embodiment, the busbar may further comprise a protruding portion integrally formed with the body portion to extend from the body portion and electrically connected to a terminal of a control circuit configured to control the battery module.

In another aspect of the present disclosure, there is also provided a battery module comprising: a busbar configured to connect an electrode lead of one battery cell to an electrode lead of another battery cell; a cooling plate having a first thermal contact portion, which thermally contacts a body of each battery cell or a cooling pin configured to transfer heat of each battery cell, and a second thermal contact portion, which thermally contacts one end of the busbar, the cooling plate being configured to transfer heat generated from each battery cell to a heat sink; an insulating member interposed between the one end of the busbar and the second thermal contact portion of the cooling plate and configured to prevent current flow between the busbar and the cooling plate; and a gap filler interposed between the one end of the busbar and the second thermal contact portion of the cooling plate and configured to prevent separation between the busbar and the cooling plate and to transfer heat therebetween.

In one embodiment, the busbar may comprise: a body portion formed in a strap shape and contacting the electrode lead of the battery cell; and a bent portion integrally formed with the body portion and extending from one end of the body portion to be bent in a thickness direction of the body portion, wherein the bent portion may comprise: a coupling groove coupled to a coupling protrusion that is prepared on the cooling plate or on a predetermined frame of the battery module, the predetermined frame being configured to support the busbar; and a thermal contact surface thermally contacting the second thermal contact portion.

In one embodiment, the busbar may further comprise a protruding portion integrally formed with the body portion to extend from the body portion and electrically connected to a terminal of a control circuit configured to control the battery module.

In one embodiment, the insulating member may be interposed at least between the thermal contact surface of the bent portion and the second thermal contact portion of the cooling plate.

In one embodiment, the gap filler may be interposed at least between the thermal contact surface of the bent portion and the second thermal contact portion of the cooling plate.

In one embodiment, the second thermal contact portion of the cooling plate may comprise the coupling protrusion coupled to the coupling groove of the bent portion.

In one embodiment, the battery module may further comprise a busbar frame configured to support the busbar to bring the body portion of the busbar into contact with the electrode lead of each battery cell and bring the bent portion of the busbar into thermal contact with the second thermal contact portion of the cooling plate.

In one embodiment, the busbar frame may comprise the coupling protrusion coupled to the coupling groove of the bent portion.

Advantageous Effects

According to the present disclosure, the busbar, which electrically connects electrode leads of the battery cells to each other, thermally contacts the cooling plate and thus cools the battery cells, whereby the electrode leads of the battery cells, which emit a relatively large amount of heat, may be efficiently cooled, and cooling pins used for cooling the battery cells in the battery module may be omitted to allow simplification and size reduction of a structure of the battery module and reduction in manufacturing costs of the battery module.

In addition, the bent portion prepared in the busbar is coupled to the protrusion prepared on the cooling plate or the like and thus thermally contacts the cooling plate, and the gap filler is arranged between the bent portion and the cooling plate, whereby the possibility of separation between the busbar and the cooling plate due to vibrations generated in vehicle environments, external impacts, assembly errors, or the like may be structurally fundamentally prevented, and the cooling capability and durability of the battery module may be improved.

Further, the cooling plate thermally contacts the electrode leads of the battery cells as well as the bodies of the battery cells and thus transfers total heat of the battery cells to the heat sink, whereby the cooling capability or cooling efficiency of the battery module may be further improved.

Furthermore, it will be obviously understood by one of ordinary skill in the art from the following detailed description that various technical problems not mentioned above may be solved according to various embodiments of the present disclosure.

BEST MODE

Hereinafter, embodiments of the present disclosure will be described in detail with reference to the accompanying drawings to clarify aspects of the present disclosure. However, descriptions of the related art, which may obscure the aspects of the present disclosure, will be omitted. In addition, it should be understood that terms used herein are defined by taking into account functions in the present disclosure and may vary depending upon intentions of designers or manufacturers, customs, or the like. Therefore, it will be understood that the terms used herein should be defined based on the disclosure throughout the specification.

Figure 1:
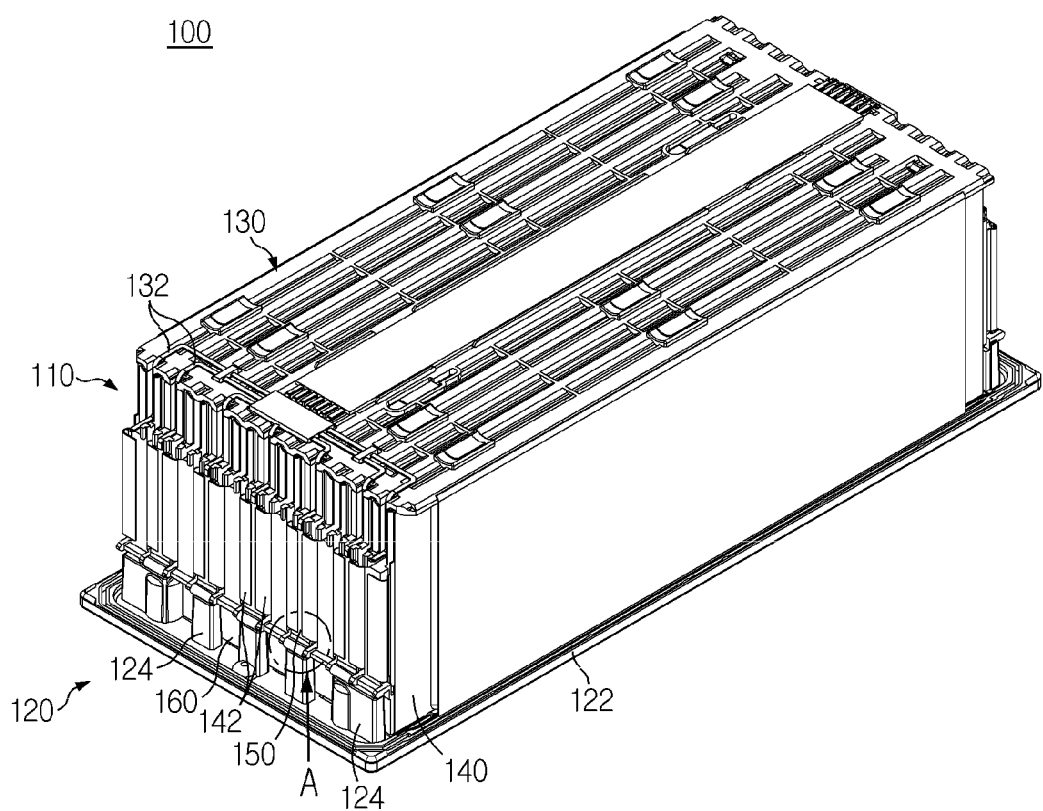
FIG. 1 is a perspective view illustrating a battery module according to an embodiment of the present disclosure.
Figure 2:
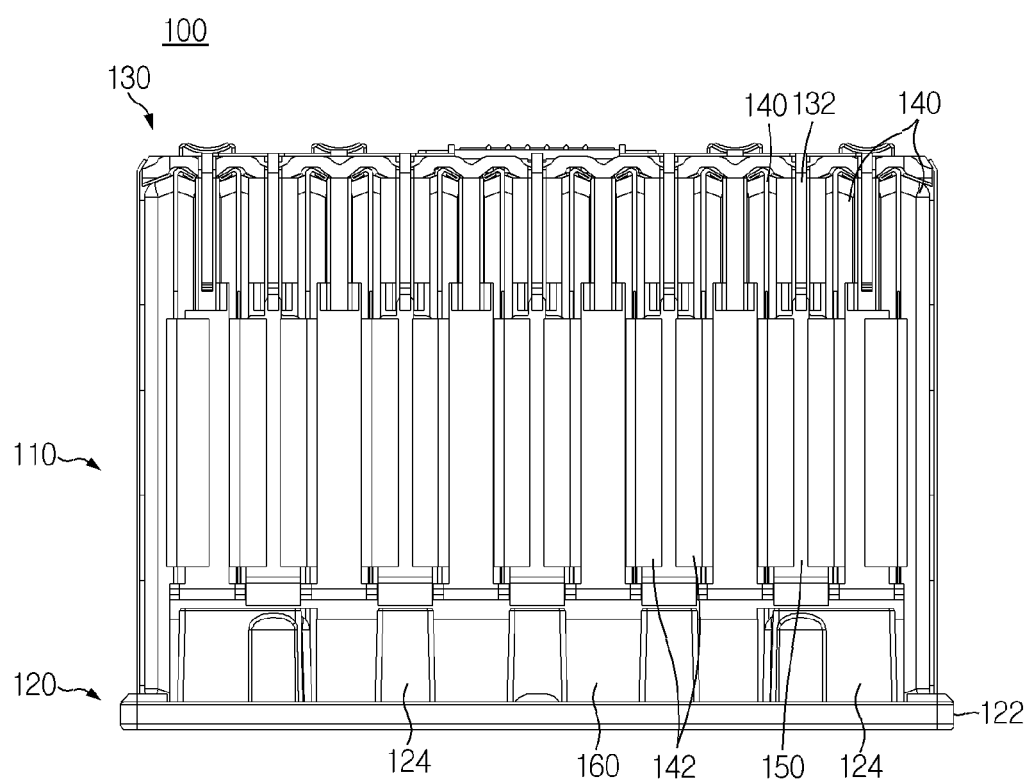
FIG. 2 is a front view illustrating the battery module of FIG. 1.

FIGS. 1 and 2 respectively show a perspective view and a front view illustrating a battery module according to an embodiment of the present disclosure. In addition, FIG. 3 shows a perspective view illustrating that a cooling plate of the battery module of FIG. 1 is disassembled.

Figure 3:
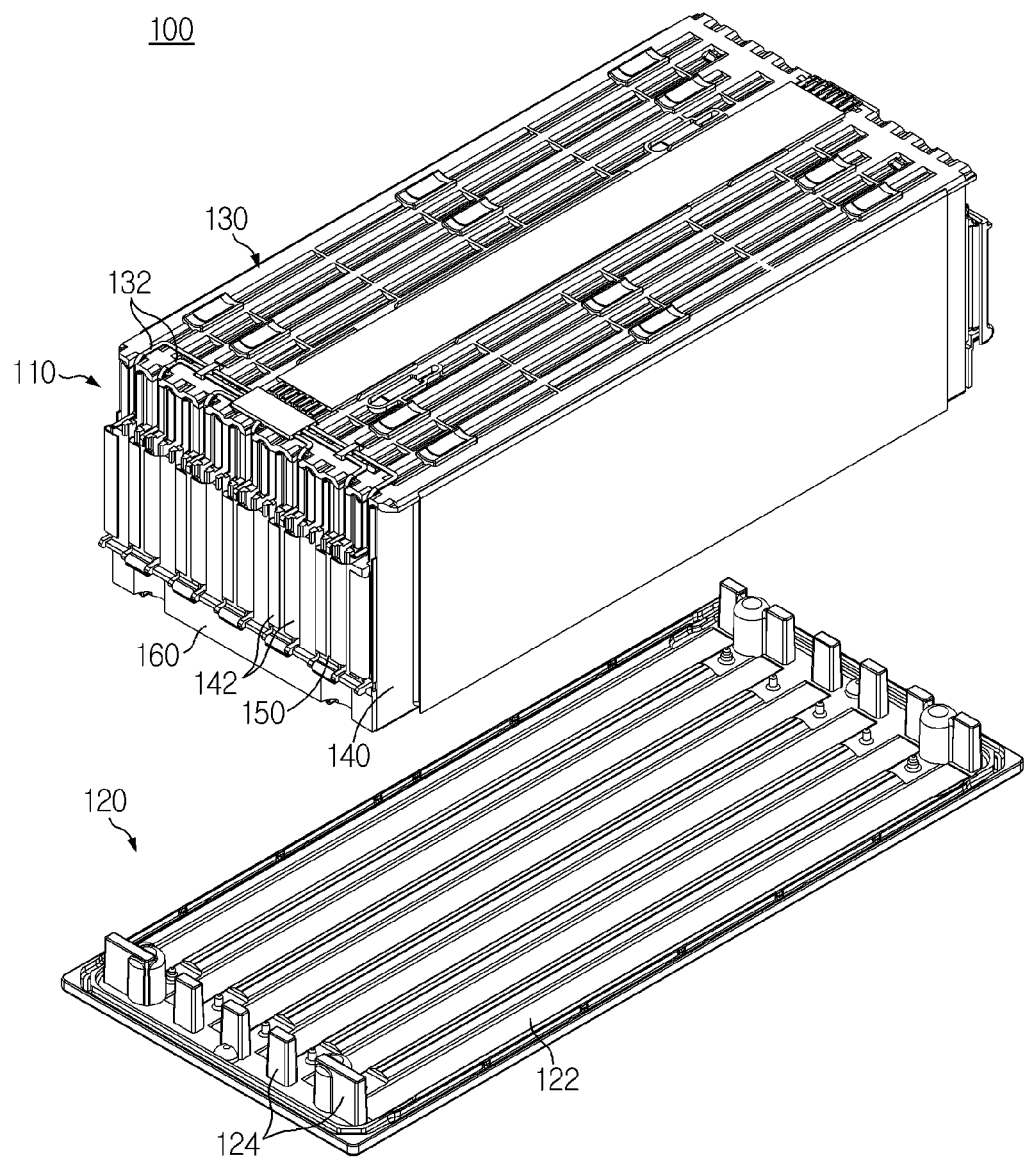
FIG. 3 is a perspective view illustrating that a cooling plate of the battery module of FIG. 1 is disassembled.

As shown in FIGS. 1 to 3, a battery module 100 according to an embodiment of the present disclosure may include a battery cell stack structure 110, a cooling plate 120, and a control circuit panel 130. Here, the battery cell stack structure 110 may include a plurality of battery cells 140 and a plurality of busbars 150 corresponding thereto, and may further include a busbar frame 160 or the like. The battery cell stack structure 110 has a stack structure in which the plurality of battery cells 140 are sequentially stacked. In this case, each battery cell 140 may be configured in a pouch type to be easily stacked. That is, the battery cell 140 may be a pouch type battery cell obtained by placing an electrode assembly in a pouch case (laminate sheet) including a metal layer and a resin layer, followed by sealing a rim of the case by thermal fusion. In addition, a cooling pin (not shown) may be interposed between the battery cells, the cooling pin contacting an outer body of the battery cell, that is, the pouch case of the battery cell. The cooling pin may be formed in a plate shape and contact a body of the battery cell, and a lower end of the cooling pin may contact the cooling plate 120, whereby the cooling pin may transfer heat generated from the battery cell to the cooling plate 120. In one embodiment, the battery cell stack structure 110 may be configured without the cooling pin. The reason is that battery modules according to various embodiments of the present disclosure may basically cool the battery cell via the busbar 150.

Although described again below, the busbar 150 of the battery cell stack structure 110 contacts an electrode lead 142 of the battery cell 140, thereby electrically connecting the electrode lead of one battery cell to the electrode lead of another battery cell, and simultaneously, thermally contacts the cooling plate 120 via one end of the busbar, thereby transferring heat generated from electrode leads of the battery cells to the cooling plate 120.

The cooling plate 120 thermally contacts a heat sink (not shown) configured to absorb heat by using a refrigerant, and transfers heat generated from the battery cells to the heat sink. Generally, a flow path is formed inside the heat sink, and the refrigerant, such as cooling water, cooling gas, or air, which moves through the flow path, absorbs heat transferred through the cooling plate 120 and discharges the heat outside the heat sink. For this purpose, the cooling plate 120 may be arranged under the battery cell stack structure 110, and may include a first thermal contact portion 122 and a second thermal contact portion 124. In this case, the first thermal contact portion 122 is configured in a plate shape on the whole and arranged parallel to a stacking direction of the battery cell stack structure 110, thermally contacts the body of the battery cell 140 or the cooling pin, which transfers the heat of the battery cell 140, via an upper surface of the first thermal contact portion 122, and thermally contacts the heat sink via a lower surface of the first thermal contact portion 122. The second thermal contact portion 124 vertically protrudes from the upper surface of the first thermal contact portion 122 and thermally contacts the one end of the busbar 150. In this case, as shown in FIGS. 1 to 3, the second thermal contact portion 124 may be configured as a plurality of protruding portions respectively thermally contacting busbars of the battery cell stack structure 110, and of course, may also be configured as a single protruding portion of a wall shape, which thermally contacts all of the busbars.

In addition, the control circuit panel 130 includes a control circuit configured to control operations of the battery module 100. The control circuit may control charge-discharge operations of the plurality of battery cells 140 included in the battery module 100, or may perform energy balancing or the like to prevent a voltage imbalance between the battery cells and to maintain a voltage balance between the battery cells. Terminals 132 of the control circuit are respectively electrically connected to corresponding busbars 150.

Figure 4:
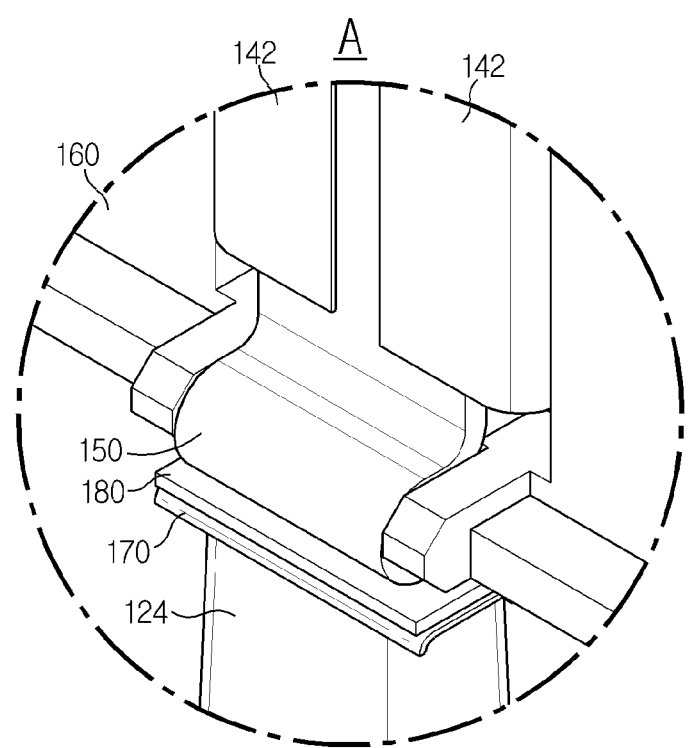
FIG. 4 is an enlarged view illustrating a portion A of FIG. 1.

FIG. 4 shows an enlarged view illustrating a portion A of FIG. 1.

As shown in FIG. 4, the busbar 150 of the battery cell stack structure 110 is basically a member configured to connect the plurality of battery cells 140 included in the battery module 100 in series or parallel. That is, the busbar 150 contacts the electrode lead 142 of each battery cell 140 and electrically connects the electrode lead of one battery cell to the electrode lead of another battery cell. Further, according to the present disclosure, the busbar 150 thermally contacts the second thermal contact portion 124 of the cooling plate 120 via the one end thereof, and transfers the heat generated from the electrode lead of each battery cell to the cooling plate 120. For this purpose, the battery module 100 may include an insulating member 170 and a gap filler 180.

In this case, the insulating member 170 is interposed between the one end of the busbar 150 and the second thermal contact portion 124 of the cooling plate 120 and prevents current flow between the busbar 150 and the cooling plate 120. The insulating member 170 may include various materials having insulating properties, such as silicone, butyl rubber, polyvinyl chloride, polyethylene terephthalate, or polyimide. In addition, the insulating member 170 may be realized in the form of an insulating tape.

In addition, the gap filler 180 is interposed between the one end of the busbar 150 and the second thermal contact portion 124 of the cooling plate 120, and transfers heat between the busbar 150 and the cooling plate 120 while preventing separation therebetween. The gap filler 180 may include an elastic and thermally conductive material such as an elastomer. In addition, the gap filler 180 may include an elastic rubber, an adhesive material, or the like.

Figure 5:
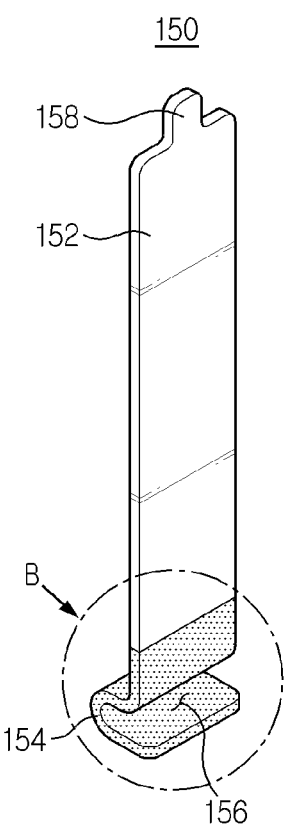
FIG. 5 is a perspective view illustrating a busbar for cooling battery cells according to an embodiment of the present disclosure.
Figure 6:
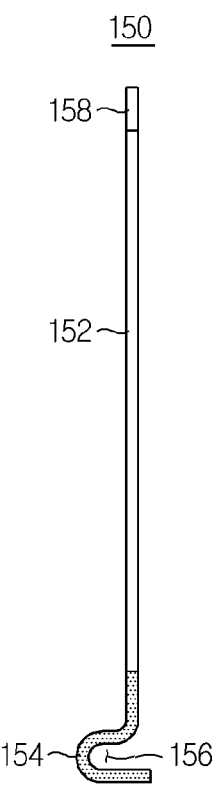
FIG. 6 is a side view illustrating the busbar of FIG. 5.

FIGS. 5 and 6 respectively show a perspective view and a side view illustrating a busbar for cooling battery cells according to an embodiment of the present disclosure.

As shown in FIGS. 5 and 6, the busbar 150 for cooling battery cells according to an embodiment of the present disclosure may include a body portion 152 and a bent portion 154, and may further include a protruding portion 158. The body portion 152 is formed in a strap shape and contacts the electrode lead 142 of the battery cell 140. In this case, the body portion 152 may contact and be coupled to the electrode lead 142 by welding or the like. The bent portion 154 is integrally formed with the body portion 152 and extends from one end of the body portion 152 to be bent in a thickness direction of the body portion 152. As such, the busbar 150 includes the bent portion 154 in the one end thereof, the bent portion 154 being bent in the thickness direction of the body portion 152, whereby the busbar 150 may have an expanded area of a thermal contact surface thermally contacting the cooling plate 120 while having a coupling groove 156 coupled to a coupling protrusion that is prepared on the cooling plate 120 or a coupling protrusion that is prepared on a predetermined frame 160 of the battery module 100, the predetermined frame 160 being configured to support the busbar 150. The protruding portion 158 is integrally formed with the body portion 152 to protrude from the body portion 152, and is electrically connected to a terminal 132 of the control circuit configured to control the battery module 100.

In addition, the insulating member 170 or the gap filler 180 of the battery module 100 may be arranged on the bent portion 154 of the busbar 150. That is, the insulating member 170 or the gap filler 180 of the battery module 100, as shown in FIG. 4, may be realized as a separate member interposed between the thermal contact surface (lower surface) of the bent portion 154 formed in the busbar 150 and the second thermal contact portion 124 of the cooling plate 120, and of course, may also be realized in the form of a coating material or covering material coated on or attached to a surface of the bent portion 154 of the busbar 150.

Figure 7:
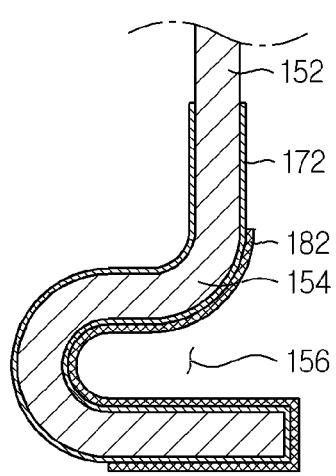
FIG. 7 is a vertical cross-sectional view illustrating a portion B of FIG. 5.

FIG. 7 shows a vertical cross-sectional view illustrating a portion B of FIG. 5.

As shown in FIG. 7, the busbar 150 for cooling battery cells according to an embodiment of the present disclosure may further include an insulating member 172 and a gap filler 182. In this case, the insulating member 172, at least on the thermal contact surface of the bent portion 154, prevents current flow between the busbar 150 and the cooling plate 120. For example, the insulating member 172 may be realized in the form of an insulation covering material coated on the surface of the bent portion 154. In addition, the gap filler 180, at least on the thermal contact surface of the bent portion 154, prevents separation between the bent portion 154 and the cooling plate 120 and transfers heat therebetween. For example, the gap filler 180 may be realized in the form of an elastic polymer member attached onto the thermal contact surface of the bent portion 154.

In addition, the busbar 150 may be coupled to a coupling protrusion that is prepared on a busbar frame 160, which supports the busbar 150, or a coupling protrusion that is prepared on the cooling plate 120, via the coupling groove 156 of the bent portion 154 of the busbar 150.

Figure 8:
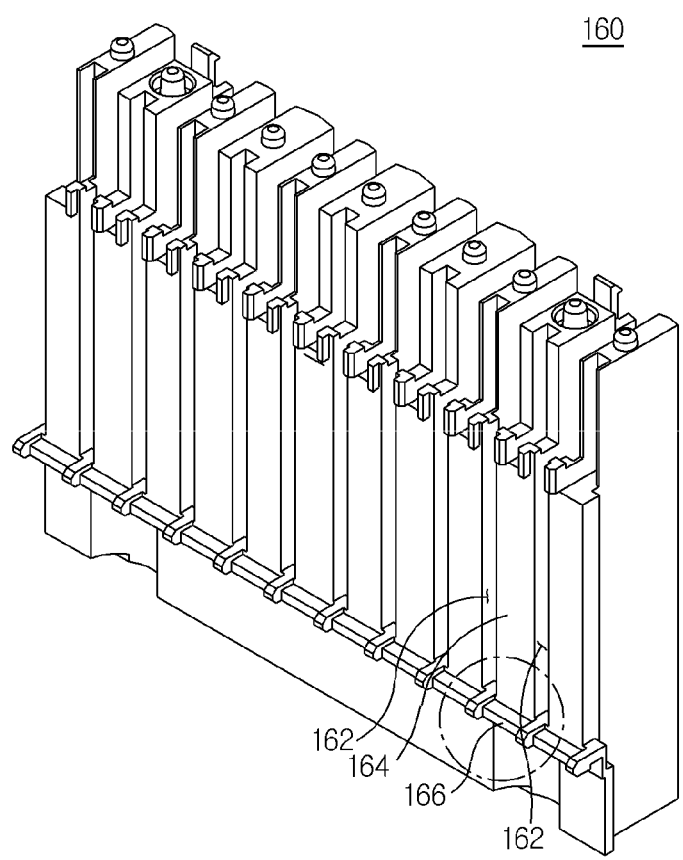
FIG. 8 is a perspective view illustrating a busbar frame of the battery module of FIG. 1.

FIG. 8 shows a perspective view illustrating the busbar frame 160 of the battery module 100 of FIG. 1.

As shown in FIG. 8, the busbar frame 160 of the battery module 100 according to an embodiment of the present disclosure may include a plurality of slots 162, a support portion 164, and a coupling protrusion 166. The busbar frame 160 supports the busbar 150, thereby bringing the body portion 152 of the busbar 150 into contact with the electrode lead 142 of the battery cell 140 and bringing the bent portion 154 of the busbar 150 into thermal contact with the second thermal contact portion 124 of the cooling plate 120. That is, the electrode lead 142 of the battery cell 140 is arranged to be inserted into a slot 162 of the busbar frame 160. In addition, the busbar 150 is arranged to be supported by the support portion 164 of the busbar frame 160, and contacts and is coupled to the electrode lead 142 of the battery cell 140, which is inserted into the corresponding slot 162. Here, the bent portion 154 of the busbar 150 may be coupled to the coupling protrusion 166 of the busbar frame 160 via the coupling groove 156 of the bent portion 154. The thermal contact surface (lower surface) of the bent portion 154 coupled to the coupling protrusion 166 of the busbar frame 160 thermally contacts the second thermal contact portion 124 of the cooling plate 120.

Figure 9:
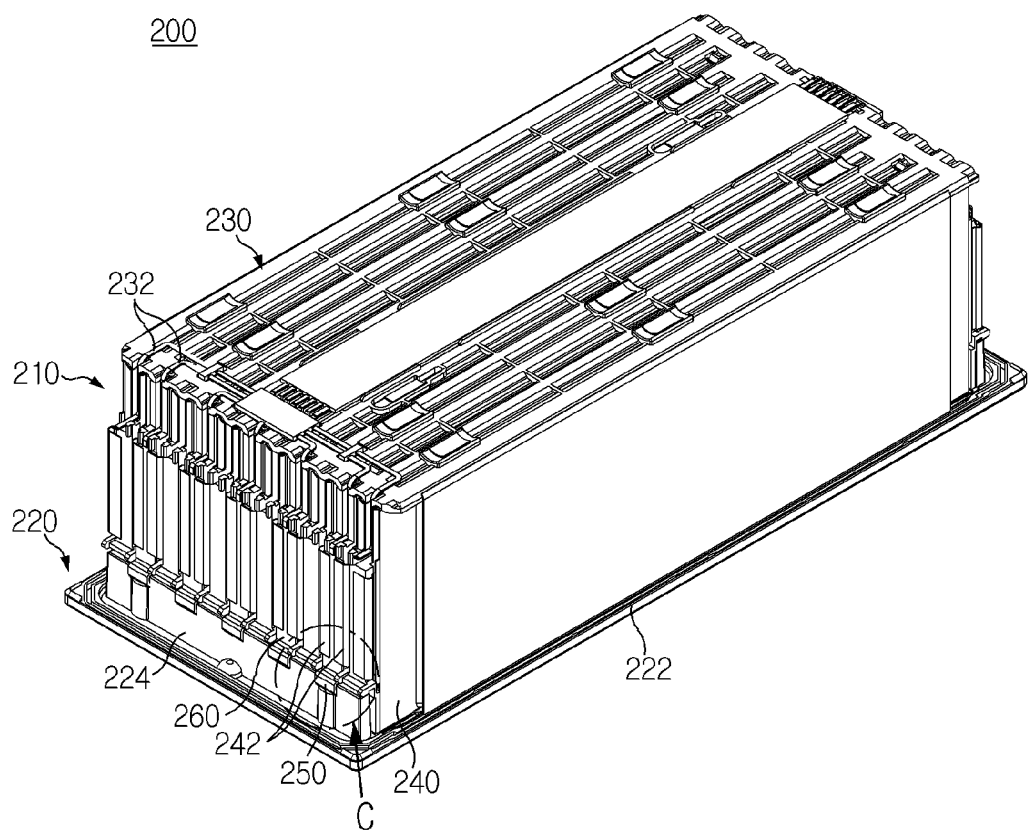
FIG. 9 is a perspective view illustrating a battery module according to another embodiment of the present disclosure.
Figure 10:
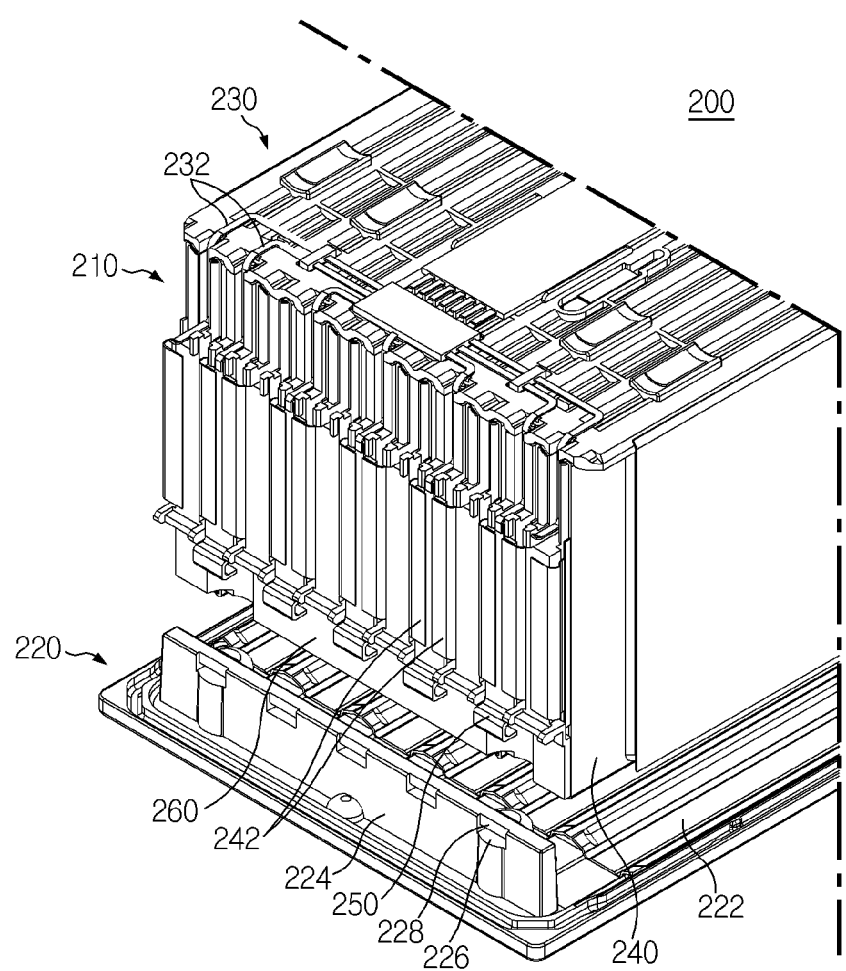
FIG. 10 is a perspective view illustrating that a cooling plate of the battery module of FIG. 9 is disassembled.

FIG. 9 shows a perspective view illustrating a battery module 200 according to another embodiment of the present disclosure. FIG. 10 shows a perspective view illustrating that a cooling plate 220 of the battery module 200 of FIG. 9 is disassembled.

As shown in FIGS. 9 and 10, the battery module 200 according to another embodiment of the present disclosure may include a battery cell stack structure 210, the cooling plate 220, and a control circuit panel 230. Here, the battery cell stack structure 210 may include a plurality of battery cells 240 and a plurality of busbars 250 corresponding thereto, and may further include a busbar frame 260 or the like. Configurations and operations of the battery cell stack structure 210, the cooling plate 220, and the control circuit panel 230 may be basically described identically to those of the battery cell stack structure 110, the cooling plate 120, and the control circuit panel 130 shown in FIGS. 1 to 3.

It should be noted that a coupling protrusion coupled to a busbar 250 of the battery cell stack structure 210 is formed on a second thermal contact portion 224 of the cooling plate 220 rather than on the busbar frame 260. That is, the second thermal contact portion 224 of the cooling plate 220 includes a correspondence coupling groove 226 and a coupling protrusion 228, which coincide with a bent portion of the busbar 250 in terms of shape.

Figure 11:
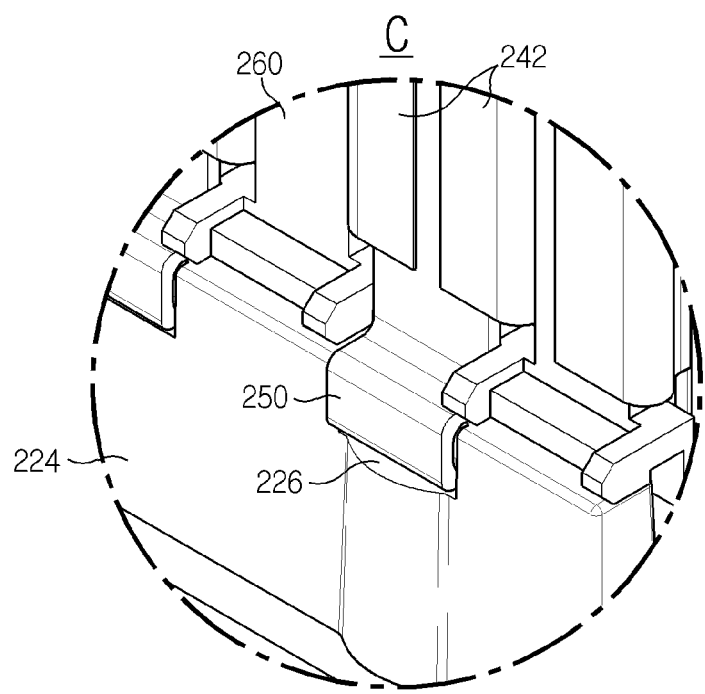
FIG. 11 is an enlarged view illustrating a portion C of FIG. 9.

FIG. 11 shows an enlarged view illustrating a portion C of FIG. 9.

As shown in FIG. 11, the busbar 250 of the battery cell stack structure 210 contacts an electrode lead 242 of each battery cell 240 and electrically connects the electrode lead of one battery cell to the electrode lead of another battery cell. In addition, the busbar 250 thermally contacts the second thermal contact portion 224 of the cooling plate 220 via the bent portion thereof, and transfers heat generated from electrode leads of the battery cells to the cooling plate 220. In this case, the bent portion of the busbar 250 is inserted into the correspondence coupling groove 226 formed in the second thermal contact portion 224 of the cooling plate 220, and is coupled to the coupling protrusion 228 of the second thermal contact portion 224. In this case, an insulating member and a gap filler of the battery module 200 may be arranged on an inner surface of the bent portion of the busbar 250 and an inner surface of the correspondence coupling groove 226 of the cooling plate 120. For example, the busbar 150 of the battery module 200 may include an insulating layer and an elastic polymer layer on a thermal contact surface of the bent portion formed in the busbar 250, as shown in FIG. 7.

Each of battery modules according to various embodiments of the present disclosure may be included in various vehicles using electric power, such as electric vehicles or hybrid electric vehicles, and may be realized as a power supply configured to supply power in a corresponding vehicle environment.

As described above, according to the present disclosure, the battery cells are cooled by bringing the busbar, which electrically connects the electrode leads of the battery cells to each other, into thermal contact with the cooling plate, whereby the electrode leads of the battery cells, which emit a relatively large amount of heat, may be efficiently cooled, and the cooling pins used for cooling the battery cells in the battery module may be omitted to allow simplification and size reduction of a structure of the battery module and reduction in manufacturing costs of the battery module. In addition, the bending portion prepared in the busbar is coupled to the protrusion prepared on the cooling plate or the like and thus thermally contacts the cooling plate, and the gap filler is arranged between the bent portion and the cooling plate, whereby the possibility of separation between the busbar and the cooling plate due to vibrations generated in vehicle environments, external impacts, assembly errors, or the like may be structurally fundamentally prevented, and the cooling capability and durability of the battery module may be improved. Further, the cooling plate thermally contacts the electrode leads of the battery cells as well as the bodies of the battery cells and thus transfers total heat of the battery cells to the heat sink, whereby the cooling capability or cooling efficiency of the battery module may be further improved. Furthermore, it will be understood that, in the art and in the related art, various technical problems other than those mentioned herein may be solved according to the embodiments of the present disclosure.

Heretofore, the present disclosure has been described with reference to some specific embodiments. However, it will be clearly understood by those skilled in the art that various modified embodiments may be made without departing from the scope of the present disclosure. Therefore, the foregoing embodiments should be considered in a descriptive perspective rather than in a limited perspective. That is, it should be understood that the scope of the present disclosure is defined by the appended claims, and that all differences within the scope of equivalents thereof are to be construed as falling within the scope of the present disclosure.

What is claimed is:

1. A busbar for cooling a plurality of battery cells included in a battery module, the busbar comprising:
   a body portion formed in a strap shape and contacting an electrode lead of each battery cell; and
   a bent portion integrally formed with the body portion and extending from one end of the body portion to be bent in a thickness direction of the body portion,
   wherein the bent portion comprises: a coupling groove coupled to a coupling protrusion that is prepared on a cooling plate of the battery module or a coupling protrusion that is prepared on a predetermined frame of the battery module, the predetermined frame supporting the busbar; and a thermal contact surface thermally contacting the cooling plate,
   wherein the coupling groove extends perpendicularly to an extending direction of the body portion,
   wherein the coupling groove is defined by an initial bend where the bent portion begins, an end portion that extends perpendicularly to the body portion, and a final bend that is between the initial bend and the end portion, and
   wherein an end of the coupling groove extends past the initial bend.

2. The busbar according to claim 1, further comprising:
an insulating member at least on the thermal contact surface of the bent portion, the insulating member being configured to prevent current flow between the busbar and the cooling plate.

3. The busbar according to claim 2, further comprising:
a gap filler at least on the thermal contact surface of the bent portion, the gap filler being configured to prevent separation between the bent portion and the cooling plate and to transfer heat therebetween.

4. The busbar according to claim 1, further comprising:
a protruding portion integrally formed with the body portion to extend from the body portion and electrically connected to a terminal of a control circuit configured to control the battery module.

5. A battery module comprising a plurality of battery cells, the battery module comprising:
a busbar configured to connect an electrode lead of one battery cell to an electrode lead of another battery cell;
a cooling plate having a first thermal contact portion, which thermally contacts a body of each battery cell or a cooling pin configured to transfer heat of each battery cell, and a second thermal contact portion, which thermally contacts one end of the busbar, the cooling plate being configured to transfer heat generated from each battery cell to a heat sink;
an insulating member interposed between the one end of the busbar and the second thermal contact portion of the cooling plate and configured to prevent current flow between the busbar and the cooling plate; and
a gap filler interposed between the one end of the busbar and the second thermal contact portion of the cooling plate and configured to prevent separation between the busbar and the cooling plate and to transfer heat therebetween,
wherein the busbar comprises:
a body portion formed in a strap shape and contacting the electrode lead of each battery cell; and
a bent portion integrally formed with the body portion and extending from one end of the body portion to be bent in a thickness direction of the body portion, and
wherein the bent portion comprises: a coupling groove coupled to a coupling protrusion that is prepared on the cooling plate or a coupling protrusion that is prepared on a predetermined frame of the battery module, the predetermined frame supporting the busbar; and a thermal contact surface thermally contacting the second thermal contact portion.

6. The battery module according to claim 5, wherein the busbar further comprises a protruding portion integrally formed with the body portion to extend from the body portion and electrically connected to a terminal of a control circuit configured to control the battery module.

7. The battery module according to claim 5, wherein the insulating member is interposed at least between the thermal contact surface of the bent portion and the second thermal contact portion of the cooling plate.

8. The battery module according to claim 5, wherein the gap filler is interposed at least between the thermal contact surface of the bent portion and the second thermal contact portion of the cooling plate.

9. The battery module according to claim 5, wherein the second thermal contact portion of the cooling plate comprises the coupling protrusion coupled to the coupling groove of the bent portion.

10. The battery module according to claim 5, further comprising:
a busbar frame configured to support the busbar to bring the body portion of the busbar into contact with the electrode lead of each battery cell and bring the bent portion of the busbar into thermal contact with the second thermal contact portion of the cooling plate.

11. The battery module according to claim 10, wherein the busbar frame comprises the coupling protrusion coupled to the coupling groove of the bent portion.

12. A vehicle comprising the battery module according to claim 5.

13. The battery module according to claim 5, wherein the coupling groove extends perpendicularly to an extending direction of the body portion,
wherein the coupling groove is defined by an initial bend where the bent portion begins, an end portion that extends perpendicularly to the body portion, and a final bend that is between the initial bend and the end portion, and
wherein an end of the coupling groove extends past the initial bend.

* * * * *